United States Patent [19]

Berkowitz

[11] 3,760,015

[45] Sept. 18, 1973

[54] PRODUCTION OF VINYLIDENE CHLORIDE AND METHYL CHLOROFORM

[75] Inventor: Sidney Berkowitz, Highland Park, N.J.

[73] Assignee: FMC Corporation, New York, N.Y.

[22] Filed: Dec. 18, 1969

[21] Appl. No.: 886,378

[52] U.S. Cl. .......................... 260/658 R, 260/654 D
[51] Int. Cl. ............................................. C07c 17/08
[58] Field of Search ..................... 260/654 D, 658 R

[56] References Cited
UNITED STATES PATENTS
3,065,280   11/1962   Vogt ................................... 260/654
2,803,678   8/1957   Conrad .............................. 260/654

Primary Examiner—Leon Zitver
Assistant Examiner—A. Siegel
Attorney—Frank Ianno, Eugene G. Seems and Milton Zucker

[57] ABSTRACT

1,1,2-Trichloroethane is cracked to vinylidene chloride and other dichloroethylenes, and hydrogen chloride, by heating to 300°–500°C in the presence of sodium chloride crystals; the resultant mixture can be separated, or fed directly into a suspension in an anhydrous carrier of a Friedel-Crafts carrier such as ferric chloride, maintained at a temperature of below 75°C, where the vinylidene chloride is converted to methyl chloroform, and the other dichloroethylenes are reconverted to 1,1,2-trichloroethane.

6 Claims, No Drawings

PRODUCTION OF VINYLIDENE CHLORIDE AND METHYL CHLOROFORM

FIELD OF THE INVENTION

This invention is concerned with the production of vinylidene chloride from 1,1,2-trichloroethane, and with the production of methyl chloroform therefrom.

RELATED APPLICATIONS

This application is related to the copending Lobunez application entitled "Hydrochlorination of vinylidene chloride to produce methyl chloroform", Ser. No. 886,071, of even date herewith. This application is also related to Berkowitz application Ser. No. 733,787, filed June 3, 1968, now U.S. Pat. No. 3,637,872.

BACKGROUND OF THE INVENTION

The production of vinylidene chloride from 1,1,2-trichloroethane, and its conversion to methyl chloroform, are well known in the art. The second step in the process is disclosed in the Nutting et al U.S. Pat. No. 2,209,000; the entire process is disclosed in the Vogt U.S. Pat. No. 3,065,280. The methyl chloroform produced is useful as a solvent, particularly in dry cleaning.

While the Vogt process works, it has certain economic disadvantages. The first dehydrochlorination step is carried out in the presence of strong alkali, which converts to HCl cracked from the 1,1,2-trichloroethane into inorganic chloride. Moreover, the process requires the removal of water overhead, and subsequent drying of the product. Finally, the process produces tars, which represent a marked loss of yield.

OBJECTS OF THE INVENTION

This invention aims to provide a process which permits the dehydration of 1,1,2-trichloroethane to be done anhydrously, with essentially no loss of chlorine to heavies or inorganics, and to produce a product of sufficient purity so it is useable directly for the production of methyl chloroform.

STATEMENT OF THE INVENTION

I have discovered that 1,1,2-trichloroethane can be converted to hydrogen chloride and equal parts of a mixture of vinylidene chloride and a mixture of cis- and trans-dichloroethylene, by heating at a temperature of 300°–500°C, and most preferably at 400°–450°C, in the presence of sodium chloride crystals, most preferably granular rock salt. The conversion proceeds somewhat slowly, but can be completed in a single pass if a long catalyst bed is employed. The resultant mixture of hydrogen chloride, vinylidene chloride and cis- and trans-dichloroethylene can then be fed into a suspension of Friedel-Crafts carrier, preferably ferric chloride, in a solvent maintained below 75°C, where the vinylidene chloride converts into methyl chloroform, and the dichloroethylenes back to 1,1,2-trichloroethane.

DETAILED DESCRIPTION OF THE INVENTION

In accordance with my invention, I dehydrochlorinate 1,1,2-trichloroethane, partially separately produced in known fashion and partially recycled, by heating the product at 300°–500°C in the presence of sodium chloride crystals, to get a mixture of vinylidene chloride, cis- and trans-trichloroethylene, and hydrogen chloride. The products can be separated, and the vinylidene chloride used as a monomer for production of polyvinylidene chloride. However, the most economic use of the product is to feed the gaseous mixture into a suspension of a Friedel-Crafts catalyst, to convert the vinylidene chloride into methyl chloroform and the dichloroethylenes into 1,1,2-trichloroethane, which is recycled. The entire process operates with very little loss of chlorine values; under 1 percent of the material has to be purged as heavy chlorinated products. Moreover, there is no need of any purification of intermediate products; only the final product need be purified.

The dehydrochlorination step can be effectively operated at between about 300° and 500°C, with maximum conversions at 400°–450°C. Below about 300°C, conversions are not satisfactory; above about 500°C, cracking proceeds too far.

The 1,1,2-trichloroethane is evaporated in a preheater, and the gas is fed into the catalyst bed. This may be a fixed bed of rather coarse particles, or a fluidized bed of finer particles. I find it more economical to use a fixed bed, since this eliminates the problem of removing fine catalyst particles from the gas stream, which is inherent in fluid-bed operation.

The catalyst may be any form of sodium chloride. I naturally prefer to use the cheapest form — crude rock salt. In fixed-bed operations, I prefer to use granules, of the order of 6 to 8 mesh size. The catalyst is preferably placed in long tubes, and the gaseous 1,1,2-trichloroethane is drawn through the tube, or a series of tubes, depending on the feed rates desired. The tubes are heated to the desired temperature in any economic manner.

Cracking of the 1,1,2-trichloroethane proceeds rather slowly. If substantially complete conversion is desired on a single pass, only about 100 grams per hour per liter of catalyst volume can be charged. I prefer to operate under conditions which give rather complete conversion, to minimize recycle and capital investment in plant. However, faster rates can be used, with recycle.

As a safety measure, I prefer diluting the 1,1,2-trichloroethane with an inert gas, e.g. nitrogen, which is useful both as a diluent and to provide transport through the system. About equal molar quantities of nitrogen and 1,1,2-trichloroethane give good results. A fraction of a per cent of chlorine — of the order of 0.001 mol per mol of 1,1,2-trichlorethane — is desirably present to speed up the reaction.

The cracking operation produces hydrogen chloride, in admixture with a 50—50 mix of vinylidene chloride on the one hand, and cis- and trans-dichloroethylene on the other hand. This mixture is so pure that it can be fed directly into the second stage of the process. Alternatively, and less desirably, the products can be separated and used individually.

Most desirably, the effluent gas is fed directly to a suspension of Friedel-Crafts catalyst in a solvent, preferably one which can be readily separated from the product, such as perchloroethylene or 1,1,2-trichloroethane. A preferred catalyst is ferric chloride, in concentrations of from a few tenths of a percent to a few percent; but any hydrochlorination catalyst can be used, as is well known in the art. The reaction medium is maintained below 75°C, and preferably about 25°–50°C. Under these conditions, the vinylidene chloride reacts with the hydrogen chloride to produce methyl chloroform; the dichloroethylenes react to produce 1,1,2-trichloroethane.

The hydrochlorination may be run as a batch operation or may be carried out continuously, maintaining a residence time in the reaction sufficient to produce optimum conversion. The product after completion of the batch reaction, or the effluent in the case of continuous reaction, is distilled. The very lights [unreacted vinylidene chloride (BP 32°C) and the cis- and trans-dichloroethylenes (BP 47°–52°C) together with HCl] are returned to the hydrochlorination reaction; the methyl chloroform (BP 74°C) is recovered next as product; the reformed 1,1,2-trichloroethane (BP 113.5°C) is returned to the process, and the perchloroethylene (BP 121°C) to the reactor. Only the heavies are discarded; these amount to a fraction of a percent of this process.

SPECIFIC EXAMPLES OF THE INVENTION

The following specific examples of the invention are given by way of illustration and not by way of limitation.

EXAMPLE 1

A charge of 300 cc. of rock salt (6–8 mesh) was placed in a 1 ⅛ o.d. glass tube having a length of 24 inches. A liquid 1,1,2-trichloroethane feed stream was fed to a vaporizer and the resultant vapors, mixed with nitrogen and chlorine in the mole ratio of 1:1:0.001, were passed through the reactor heated at 450°C. A feed rate of 225 mmol/hour was maintained throughout.

The effluent gases were first collected and assayed. Approximately 100 percent of the 1,1,2-trichloroethane was dehydrochlorinated to a mixture of 50—50 mol percent vinylidene chloride and cis- and trans-dichloroethylene. The effluent gas line was then connected directly to the hydrochlorinator which consisted of a 2-liter jacketed three-necked flash containing 1000 ml. of perchloroethylene and 0.2 percent ferric chloride. The incoming gases entered via a dip-tube well below the surface of the perchlorethylene. The perchloroethylene was circulated by means of a pump to insure sufficient mixing. Temperatures were carefully monitored by means of a controller-recorder. Samples of the reaction medium were removed periodically and analyzed.

Thus, an effluent stream from the rock salt reactor containing 112.5 mmol/hour of vinylidene chloride, 112.5 mmol/hour of cis- and trans-dichloroethylene, and 225 mmol/hour of hydrogen chloride was fed into the hydrochlorinator. The temperature of the reaction medium was maintained at 25°–30°C by external cooling. The product stream was subsequently removed from the reactor, distilled and the products analyzed. There was produced 92 mmol/hour of methyl chloroform and 92 mmol/hour of 1,1,2-trichloroethane (82 percent of the theoretical conversion). The balance, consisting of equal molar portions of unreacted vinylidene chloride, cis- and trans-dichloroethylene and hydrogen chloride, was recycled back into the hydrochlorinator. The reformed 1,1,2-trichloroethane was recycled as part of the starting feed stream entering the rock salt dehydrochlorinator. A small amount of heavies (< 0.3 percent) was purged as still bottoms.

EXAMPLE 2

The same procedure, conditions and results as in Example 1 except that the inert medium for the hydrochlorinator was 1,1,2-trichloroethane instead of perchloroethylene.

Obviously, the examples can be multiplied indefinitely, without departing from the scope of the invention, which is defined in the claims.

What is claimed is:

1. The method of producing methyl chloroform from 1,1,2-trichloroethane which comprises dehydrochlorinating the 1,1,2-trichloroethane to a mixture of hydrogen chloride, vinylidene chloride and cis- and trans-dichloroethylene by heating at 300°–500°C in the presence of sodium chloride crystals for a sufficient time to convert a major portion of the charge, and passing the resultant gaseous mixture directly as the sole feed into a reactor containing a suspension of a Friedel-Crafts catalyst in a liquid carrier selected from the group consisting of 1,1,2-trichloroethane and perchloroethylene maintained at below 75°C, maintaining the reaction for a time sufficient to effect a major hydrochlorination of the vinylidene chloride to methyl chloroform and of the dichloroethylenes to 1,1,2-trichloroethane, and recovering methyl chloroform from the product.

2. The method of claim 1, in which the dehydrochlorination temperature is 400°–450°C.

3. The method of claim 1, in which the dehydrochlorination catalyst is rock salt.

4. The method of claim 1, in which the dehydrochlorination catalyst is granular rock salt maintained in an elongated bed; and the 1,1,2-trichloroethane vapors are passed through the bed at a rate which insures major conversion on said passage.

5. The method of claim 4, in which the 1,1,2-trichloroethane vapors are diluted with an inert gas containing a fraction of a percent of chlorine.

6. The method of claim 1, in which the Friedel-Crafts catalyst is ferric chloride.

* * * * *